US010994682B2

(12) United States Patent
Hasegawa et al.

(10) Patent No.: US 10,994,682 B2
(45) Date of Patent: May 4, 2021

(54) VEHICLE BODY STRUCTURE

(71) Applicant: HONDA MOTOR CO., LTD., Tokyo (JP)

(72) Inventors: Atsushi Hasegawa, Wako (JP); Keiichiro Tsuji, Wako (JP); Yusuke Miura, Yamato (JP); Ryota Yamane, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 112 days.

(21) Appl. No.: 16/572,924

(22) Filed: Sep. 17, 2019

(65) Prior Publication Data

US 2020/0086816 A1 Mar. 19, 2020

(30) Foreign Application Priority Data

Sep. 17, 2018 (JP) .............................. JP2018-173148

(51) Int. Cl.
*B60R 19/34* (2006.01)
*B62D 21/15* (2006.01)
*B60R 19/18* (2006.01)

(52) U.S. Cl.
CPC .............. *B60R 19/34* (2013.01); *B60R 19/18* (2013.01); *B62D 21/152* (2013.01); *B60R 2019/1833* (2013.01); *B60R 2019/1866* (2013.01)

(58) Field of Classification Search
CPC ........ B60R 2021/23382; B60R 21/233; B60R 21/2338; B60R 2021/26094; B60R 19/18; B60R 9/06; F02B 61/045; A63H 13/005; A63H 17/262; A63H 17/266
See application file for complete search history.

(56) References Cited

U.S. PATENT DOCUMENTS

| 5,378,031 A * | 1/1995 | Ohno ....................... B60R 19/24 293/102 |
| 6,334,638 B1 * | 1/2002 | Yamamuro ............. B60R 19/34 293/132 |
| 8,882,184 B2 * | 11/2014 | Naito .................... B62D 25/082 296/203.02 |
| 2003/0034661 A1 * | 2/2003 | Gotanda ................. B60R 19/24 293/155 |

(Continued)

FOREIGN PATENT DOCUMENTS

JP H0240650 U 3/1990

*Primary Examiner* — Kiran B Patel
(74) *Attorney, Agent, or Firm* — Armstrong Teasdale LLP

(57) ABSTRACT

A vehicle body structure includes a pair of side members (4) extending in a fore and aft direction on either side of a vehicle body, each side member having a hollow structure defining a hollow interior (28), and provided with a vertical outboard wall (27), a bumper beam (3) extending laterally along fore and aft ends of the side members, and curved so as to be convex on a side thereof facing away from the vehicle body, and a pair of extension members (5) each connected to a corresponding end part of the bumper beam and partly received in the hollow interior of the corresponding side member, a pair of cushioning members (72, 91, 101, 111, 123, 131) are each interposed between the corresponding extension member and the vertical outboard wall of the corresponding side member, each cushioning member being deformable in a lateral direction of the vehicle body.

9 Claims, 13 Drawing Sheets

(56) References Cited

U.S. PATENT DOCUMENTS

| | | | |
|---|---|---|---|
| 2004/0135382 A1* | 7/2004 | Sakuma | B60R 19/34 293/102 |
| 2004/0169383 A1* | 9/2004 | Shimotsu | B60R 19/34 293/133 |
| 2005/0156443 A1* | 7/2005 | Suzuki | B60R 19/24 293/154 |
| 2006/0186680 A1* | 8/2006 | Honda | B60R 19/18 293/155 |
| 2009/0079210 A1* | 3/2009 | Matsumura | B60R 19/24 293/155 |
| 2011/0012381 A1* | 1/2011 | Saito | B60R 19/34 293/133 |
| 2011/0012389 A1* | 1/2011 | Kanaya | F16F 7/12 296/187.03 |
| 2011/0285152 A1* | 11/2011 | Kwon | B60R 19/24 293/102 |
| 2012/0228890 A1* | 9/2012 | Frank | B60R 19/34 293/155 |
| 2014/0008936 A1* | 1/2014 | Kim | B60R 19/34 296/187.09 |
| 2014/0361559 A1* | 12/2014 | Sakakibara | B60R 19/34 293/133 |
| 2014/0361560 A1* | 12/2014 | Sakakibara | B60R 19/34 293/133 |
| 2014/0361561 A1* | 12/2014 | Kuriyama | B62D 25/082 293/133 |
| 2015/0076862 A1* | 3/2015 | Abe | B62D 25/082 296/187.1 |
| 2015/0329144 A1* | 11/2015 | Hara | B60R 19/24 296/187.09 |
| 2016/0121931 A1* | 5/2016 | Tamaoki | B62D 21/02 296/187.09 |
| 2016/0152201 A1* | 6/2016 | Ramoutar | B60R 19/24 296/187.1 |
| 2017/0066395 A1* | 3/2017 | Ito | B60R 19/18 |
| 2017/0088075 A1* | 3/2017 | Hashimoto | F16F 7/00 |
| 2017/0151919 A1* | 6/2017 | Kashiwagi | B60R 19/34 |
| 2017/0240128 A1* | 8/2017 | Kashiwagi | B60R 11/00 |
| 2018/0093626 A1* | 4/2018 | Nam | F16F 7/12 |
| 2018/0370571 A1* | 12/2018 | Sekiya | B62D 27/02 |
| 2019/0061823 A1* | 2/2019 | Kanamaru | B62D 25/085 |
| 2019/0315410 A1* | 10/2019 | Shinya | B62D 25/08 |
| 2020/0086815 A1* | 3/2020 | Koga | B60R 19/18 |
| 2020/0086816 A1* | 3/2020 | Hasegawa | B62D 21/152 |
| 2020/0130618 A1* | 4/2020 | Hasegawa | B60R 19/24 |
| 2020/0238935 A1* | 7/2020 | Hisada | B60R 19/18 |
| 2020/0307479 A1* | 10/2020 | Hasegawa | B60R 19/24 |

* cited by examiner

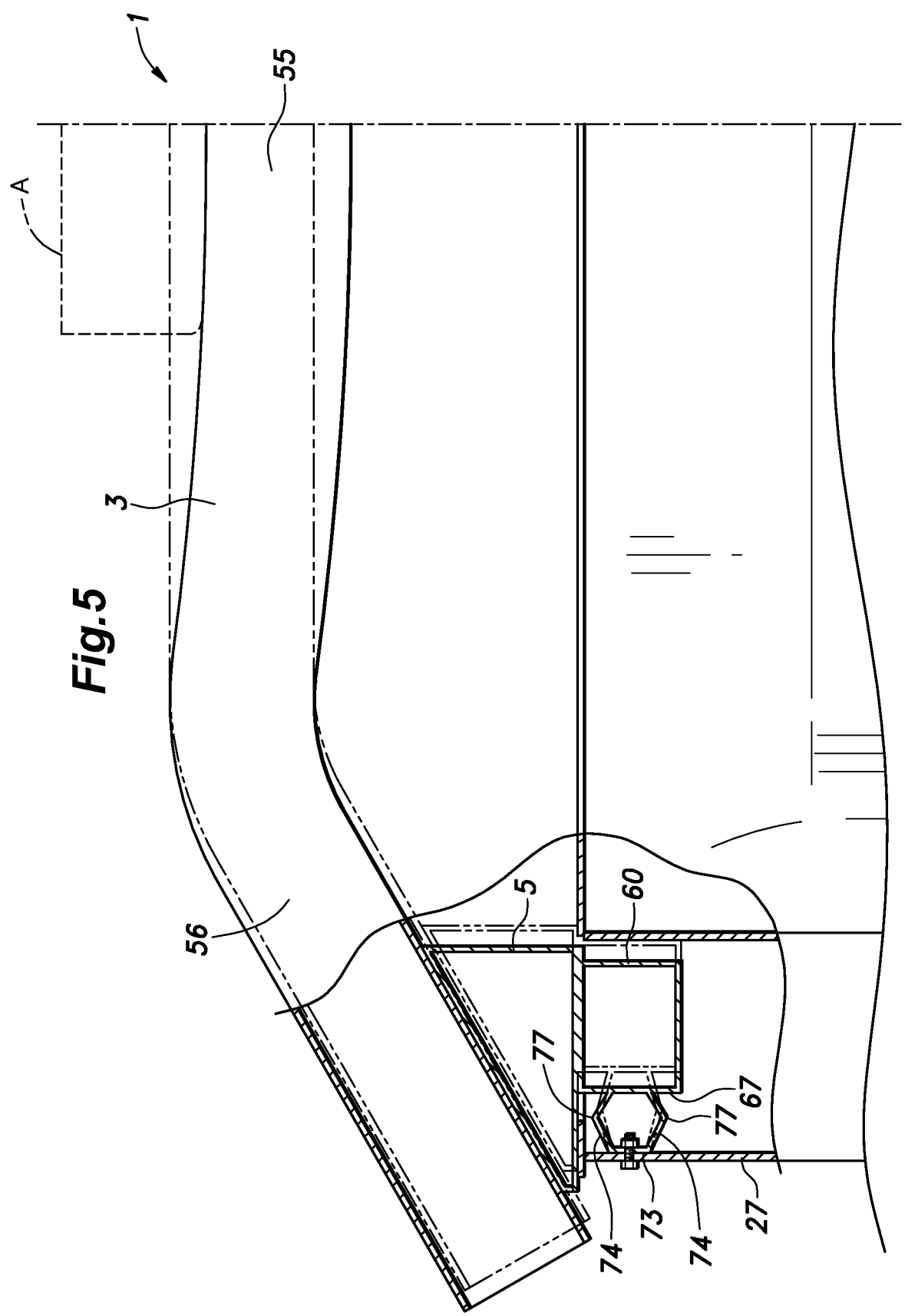

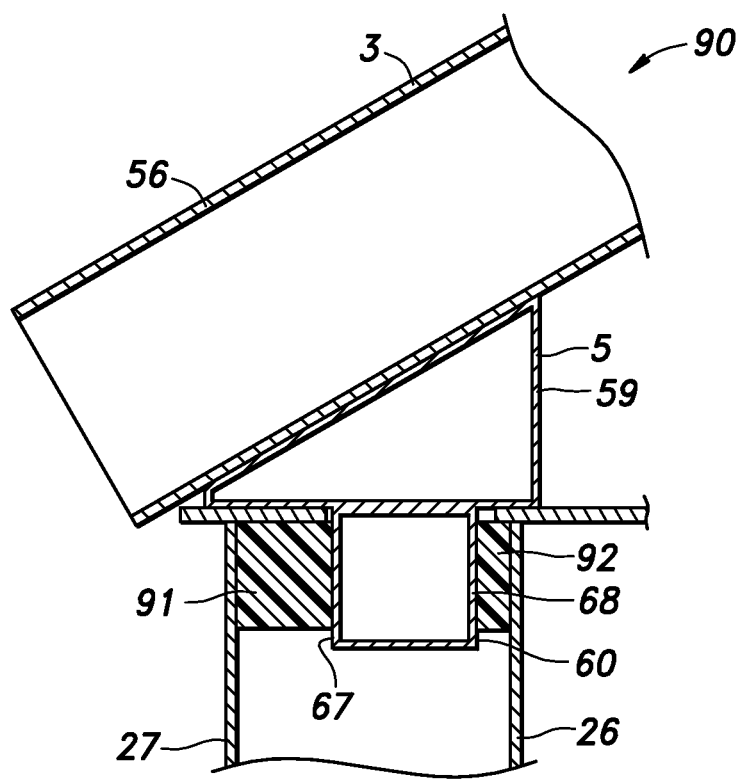

VEHICLE BODY STRUCTURE

TECHNICAL FIELD

The present invention relates to a vehicle body structure including a pair of side members extending in the fore and aft direction along either side of the vehicle body and a bumper beam extending between the front or rear ends of the side members.

BACKGROUND ART

JPH2-40650U discloses a vehicle body rear structure designed to absorb an impact of a rear end crash. This vehicle body rear structure includes a pair of side members extending in the fore and aft direction along either side of the vehicle body, a rear bumper beam extending laterally behind the rear ends of the side members, and a pair of bumper stays fixedly attached to the rear bumper beams and connected to the rear ends of the respective side members. The rear end of each bumper stay is fixedly attached to the rear bumper beam, and the front end of the bumper stay is fitted into the rear end of the corresponding side member having a rectangular hollow cross section. A vertically extending bolt is passed through the rear end of the corresponding side member and the front end of the bumper stay, and mutually abutting parts are provided on the rear end of the side member and the front end of the bumper stay.

At the time of a rear end crash, a laterally central part of the bumper beam is pushed forward so that the central part of the bumper beam bends forward while the lateral ends of the bumper beam bend rearward. This creates a torque to each bumper stay relative to the corresponding side member centered around the bolt while the mutually abutting parts opposes this rotation. If the impact load on the bumper beam is sufficiently great, the mutually abutting parts undergo plastic deformation, and absorb the energy of the impact while permitting the rotation of the bumper stay relative to the side member.

The rear bumper beam may be curved so as to be convex toward the rear for esthetical and structural reasons. In such a case, when a load is applied to the rear bumper beam from the rear, the rear bumper beam tends to deform into a straight linear shape. As a result, the two ends of the bumper beam are displaced in the outboard direction. This causes a shear stress to the bolt that joins each bumper stay to the rear end of the corresponding side member. This requires the strengthening of the bolt and the surrounding structural members, which may complicate the structure, and increase the weight of the vehicle body.

SUMMARY OF THE INVENTION

In view of such a problem of the prior art, a primary object of the present invention is to provide a vehicle body structure including a pair of side members extending in the fore and aft direction along either side of a vehicle body and a bumper beam extending along the front or rear ends of the side members and curved so as to be convex on a side thereof facing away from the vehicle body in which a lateral load that may be applied between each side member and the bumper beam at the time of a crash can be absorbed in a favorable manner.

To achieve such an object, one embodiment of the present invention provides a vehicle body structure (1, 80, 100, 110, 120, 130), comprising: a pair of side members (4) extending in a fore and aft direction on either side of a vehicle body, each side member having a hollow structure defining a hollow interior (28), and provided with a vertical outboard wall (27); a bumper beam (3) extending laterally along fore and aft ends of the side members, and curved so as to be convex on a side thereof facing away from the vehicle body; a pair of extension members (5) each connected to a corresponding end part of the bumper beam and partly received in the hollow interior of the corresponding side member; and a pair of cushioning members (72, 91, 101, 111, 123, 131) each interposed between the corresponding extension member and the vertical outboard wall of the corresponding side member, each cushioning member being deformable in a lateral direction of the vehicle body.

Upon receiving a crash load, the bumper beam tends to deform into a straight linear shape so that the two lateral ends thereof tend to be displaced in the outboard direction, and push the extension members toward the vertical outboard walls of the respective side members. As a result, the cushioning members are subjected to compressive load so that the lateral load that the extension members apply to the respective side members is favorably absorbed.

Preferably, each cushioning member (72) includes an outboard wall (73) facing in the lateral direction, and a pair of side walls (74) extending inboard from a front edge and a rear edge of the outboard wall, respectively, and having inboard edges connected to the corresponding extension member (5) so that a gap is defined between the outboard wall and the extension member.

When the bumper beam deforms into a straight linear shape under a crash load, the two ends of the bumper beam are pushed in the outboard direction or toward the corresponding vertical outboard walls so that each cushioning member is subjected to a lateral compressive load. Since the cushioning member is able to deform under the compressive load by a stroke corresponding to the gap defined between the outboard wall and the extension member, the lateral compressive load can be favorably absorbed.

Preferably, each cushioning member (101) includes an inboard wall (102) facing in the lateral direction, and a pair of side walls (103) extending outboard from a front edge and a rear edge of the inboard wall, respectively, and having outboard edges connected to the vertical outboard wall of the corresponding side member so that a gap is defined between the inboard wall and the vertical outboard wall of the side member.

When the bumper beam deforms into a straight linear shape under a crash load, the two ends of the bumper beam are pushed in the outboard direction or toward the corresponding vertical outboard walls so that each cushioning member is subjected to a lateral compressive load. Since the cushioning member is able to deform under the compressive load by a stroke corresponding to the gap defined between the inboard wall and the vertical outboard wall, the lateral compressive load can be favorably absorbed. Preferably, the side walls (74, 82) are each provided with a vertically extending outward bend (77, 83), the two bends being directed in mutually opposite directions.

Owing to the presence of the bends, each cushioning member is caused to deform in a predictable way so that the load absorbing property of the cushioning members can be controlled in an optimum manner.

Preferably, each side wall (82) is provided with a pair of vertically extending outward bends (83) and a vertically extending inward bend (85) interposed between the outward bends.

Owing to an increased number of bends, the cushioning member is given with an increased energy absorbing capability so that the lateral load acting between each side member and the bumper beam can be absorbed in an even more favorable manner. If desired, larger numbers of outward bends and inward bends may be provided in an alternating manner (so as to form a bellows-like structure) for an improved energy absorbing capability.

Preferably, each cushioning member includes a honeycomb structure (114) including a plurality of hexagonal tubes.

Owing to the favorably energy absorbing property of the honeycomb structure, the lateral load acting between each side member and the bumper beam can be absorbed in an even more favorable manner.

Preferably, each cushioning member includes a plastic member (91) which is deformable under a lateral load.

The lateral load acting between each side member and the bumper beam can be absorbed by the deformation of the plastic member.

Preferably, a bracket (124) is provided in the hollow interior of each side member, the bracket including a bottom wall (125) that inclines in an inward direction as one moves in an outboard direction, and abuts an inner end of the extension member with respect to the fore and aft direction.

When the bumper beam is subjected to a crash load, the extension member is forced in the outboard direction as the extension member is pushed against the bottom wall so that the cushioning member is compressed under the loading from the extension member. The resulting deformation of the cushioning member absorbs the impact load applied to the vehicle body.

Preferably, each cushioning member (133) comprises a tubular member (132) having an axial line extending in the lateral direction, and provided with a bellows structure including at least one narrowed portion.

Owing to the favorably energy absorbing property of the tubular member having a bellows structure, the lateral load acting between each side member and the bumper beam can be absorbed in an even more favorable manner.

The present invention thus provides a vehicle body structure including a pair of side members extending in the fore and aft direction along either side of a vehicle body and a bumper beam extending along the front or rear ends of the side members and curved so as to be convex on a side thereof facing away from the vehicle body in which a lateral load that may be applied between each side member and the bumper beam at the time of a crash can be absorbed in a favorable manner.

BRIEF DESCRIPTION OF THE DRAWING(S)

FIG. 5 is a diagram illustrating the mode of deformation of a bumper beam shown in FIG. 1:

FIG. 7 is a view similar to FIG. 2 showing a third embodiment of the present invention;

MODES FOR CARRYING OUT THE INVENTION

Preferred embodiments of the present invention are described in the following with reference to the appended drawings. As the vehicle body structure described in the following is essentially symmetric about the longitudinal center line, only one side of the vehicle body structure may be discussed in order to avoid redundancy in the description.

First Embodiment

Figure 1:
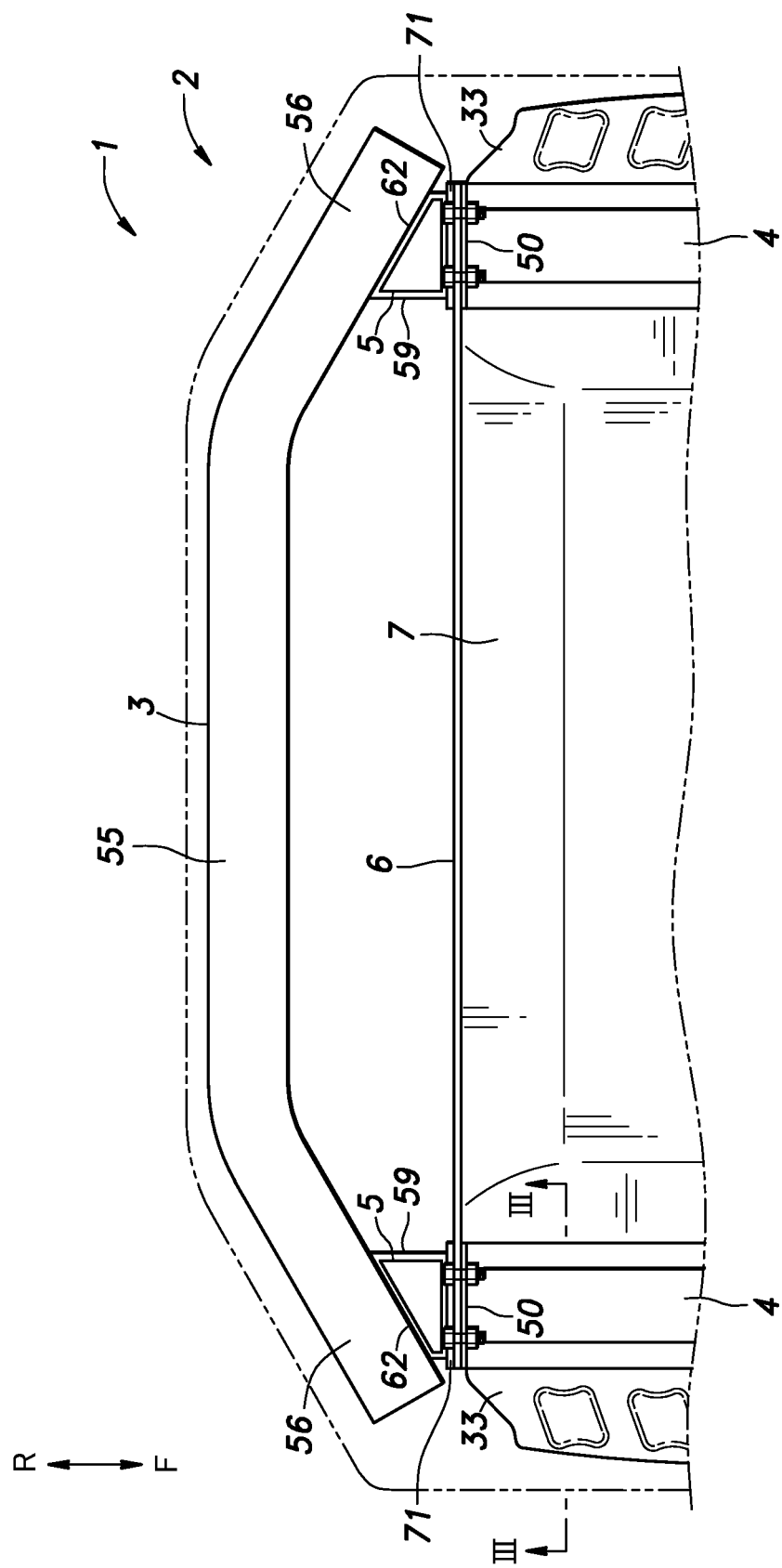
FIG. 1 is a fragmentary plan view of a vehicle body structure according to a first embodiment of the present invention.

FIG. 1 shows a rear end of a vehicle body 2 incorporated with a vehicle body structure 1 according to the present invention. The vehicle body structure 1 includes a rear bumper beam 3 extending laterally in a rear end of the vehicle body 2 and consisting of a tubular sheet metal member having a rectangular cross section, a pair of side members 4 extending in the fore and aft direction along either side of the vehicle body 2, and having rear ends connected to the rear bumper beam 3, and a pair of extension members 5 each provided between the rear end of the corresponding side member 4 and the rear bumper beam 3.

The vehicle body structure 1 further includes a rear panel 6 having a major plane facing in the fore and aft direction, and interposed between the rear end of the left side member 4 and the left extension member 5, and between the rear end of the right side member 4 and the right extension member 5, and a rear floor panel 7 having a major plane facing in the vertical direction, and connected between the two side members 4.

Figure 3:
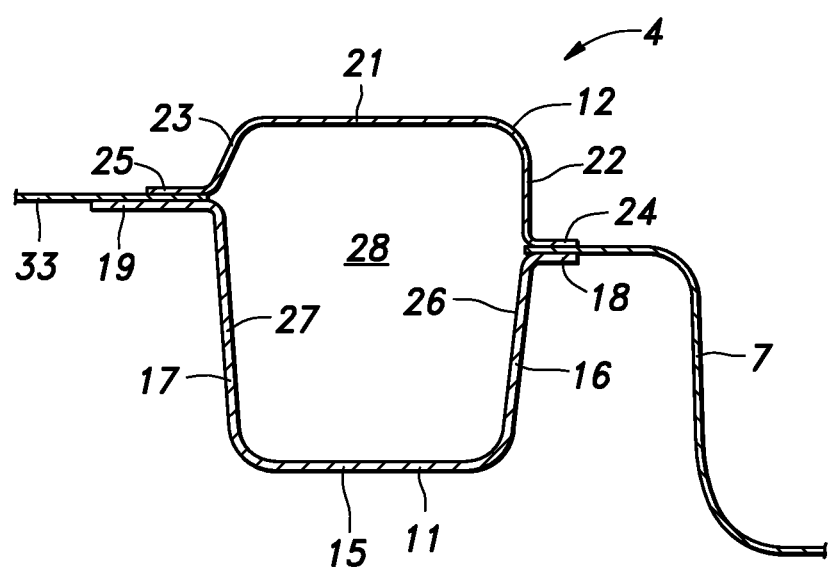
FIG. 3 is a sectional view taken along line of FIG. 1.

As shown in FIG. 3, each side member 4 includes a lower member 11 and an upper member 12 joined to each other. The lower member 11 consists of a channel member having a rectangular cross section and an open upper side, and includes a horizontal lower wall 15 elongated in the fore and aft direction, a lower inboard wall 16 extending vertically upward from the inboard edge of the lower wall 15, and a lower outboard wall 17 extending vertically upward from the outboard edge of the lower wall 15. In the illustrated embodiment, the lower member 11 further includes a lower inboard flange 18 extending from the upper edge of the lower inboard wall 16 in the inboard direction, and a lower outboard flange 19 extending from the upper edge of the lower outboard wall 17 in the outboard direction.

The upper member 12 includes a horizontal upper wall 21 elongated in the fore and aft direction, an upper inboard wall 22 extending vertically downward from the inboard edge of the upper wall 21, and an upper outboard wall 23 extending vertically downward from the outboard edge of the upper wall 21. In the illustrated embodiment, the upper member 12 further includes an upper inboard flange 24 extending from the lower edge of the upper inboard wall 22 in the inboard direction, and an upper outboard flange 25 extending from the lower edge of the upper outboard wall 23 in the outboard direction.

The upper inboard flange 24 is placed on, and spot welded to the lower inboard flange 18, and the upper outboard flange 25 is placed on, and spot welded to the lower outboard flange 19 so that the lower member 11 and the upper member 12 jointly form the side member 4 consisting of a tubular member having a rectangular cross section and defining a hollow interior 28. The side member 4 thus includes an upper wall 21, a lower wall 15, an inboard wall 26, and an outboard wall 27 (vertical outboard wall). The inboard wall 26 forms a vertical wall that delimits the inboard side of the hollow interior 28, and the outboard wall 27 forms a vertical wall that delimits the outboard side of the hollow interior 28.

The structure of the side member 4 is not limited to this embodiment, but may also be any other configuration as long as a hollow interior 28 is defined therein.

As shown in FIG. 1, an upper rear flange 50 extends vertically upward from the rear edge of the upper wall 21, and a lower rear flange (not shown in the drawings) extends vertically downward from the rear edge of the lower wall 15. The upper rear flange 50 and the lower rear flange are formed with through holes for passing bolts therethrough as will be described hereinafter.

The rear panel 6 extends laterally and substantially vertically, and is provided with a pair of openings corresponding to the rear ends of the hollow interior 28 of the side members 4, and a plurality of bolt holes corresponding to the bolt holes of the upper rear flange 50 and the lower rear flange.

The rear bumper beam 3 consists of a tubular member having a rectangular cross section and extending in the lateral direction, and is formed by, for example, extruding aluminum, an aluminum alloy or the like. The rear bumper beam 3 includes a substantially linear and laterally extending central part 55, and lateral ends parts 56 that is curved or bent toward the front. The rear bumper beam 3 thus presents a convex side facing rearward. If desired, the rear bumper beam 3 may curve generally in an arcuate shape so as to present a convex side facing rearward.

Figure 2:
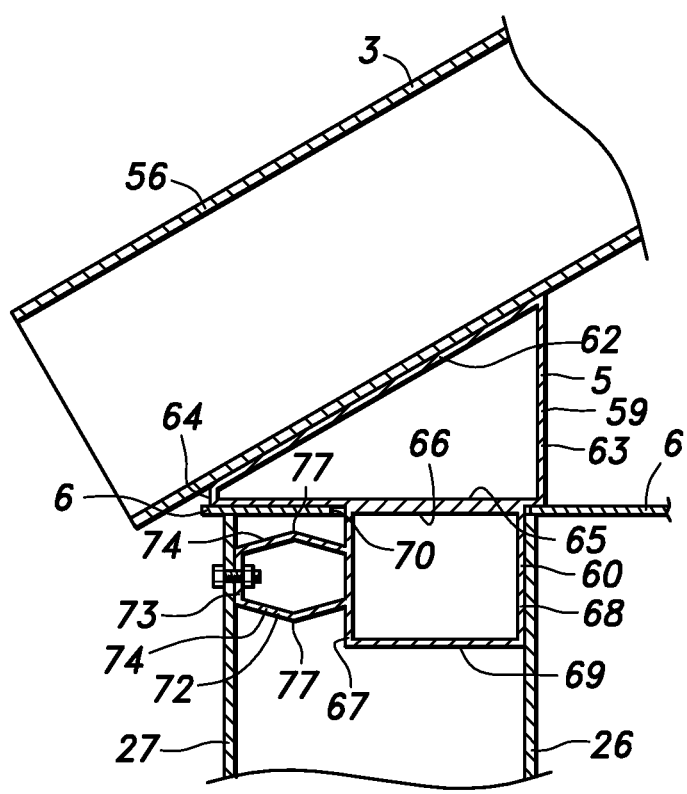
FIG. 2 is a fragmentary horizontal section view of a part of the vehicle body structure shown in FIG. 1.

As shown in FIG. 2, each extension member 5 consists of sheet metal member, preferably made of high tension steel, and includes a rear part 59 having a rear surface conforming to and fixedly attached to the opposing front surface of the lateral end part 56 of the rear bumper beam 3, and a front part 60 integrally connected to the rear part 59 and projecting forward.

As shown in FIGS. 2 and 3, the rear part 59 is provided with a tubular part having a vertically extending axial line and a right angle triangular cross section. In particular, the tubular part includes a slanted wall 62 slanting forward toward an outboard side thereof (so as to conform to the opposing surface of the lateral end part 56 of the rear bumper beam 3), an inboard wall 63 extending from the inboard edge of the slanted wall 62 in the forward direction, an outboard wall 64 extending from the outboard edge of the slanted wall 62 in the forward direction, and a front wall 65 extending between the front edges of the inboard wall 63 and the outboard wall 64 in the lateral direction. The slanted wall 62 is welded to the opposing surface of the lateral end part 56 of the rear bumper beam 3 so that the extension member 5 is fixedly connected to the rear bumper beam 3.

The front part 60 is provided with a tubular part having a vertically extending axial line and a rectangle cross section. In particular, the tubular part includes a rear wall 66 having a major plane facing in the fore and aft direction, an outboard wall 67 extending from the outboard edge of the rear wall 66 in the forward direction, an inboard wall 68 extending from the inboard edge of the rear wall 66 in the forward direction, and a front wall 69 extending between the front edges of the outboard wall 67 and the inboard wall 68 and having a major plane facing in the fore and aft direction. The rear surface of the rear wall 66 of the front part 60 abuts onto and welded to the front surface of the front wall 65 of the rear part 59. The front part 60 and the rear part 59 are typically made of stamp formed sheet steel. Alternatively, the front part 60 and the rear part 59 are integrally formed to each other, for instance, by extrusion. In such a case, the front part 60 and the rear part 59 are typically made of aluminum alloy.

The inboard wall 68 of the front part 60 is slightly offset in the outboard direction relative to the inboard wall 63 of the rear part 59 so that a vertically elongated, forward facing shoulder surface is defined at the boundary between the front part 60 and the rear part 59. The outboard wall 67 of the front part 60 is offset from the outboard wall 64 of the rear part 59 by a significantly greater distance.

Figure 4:
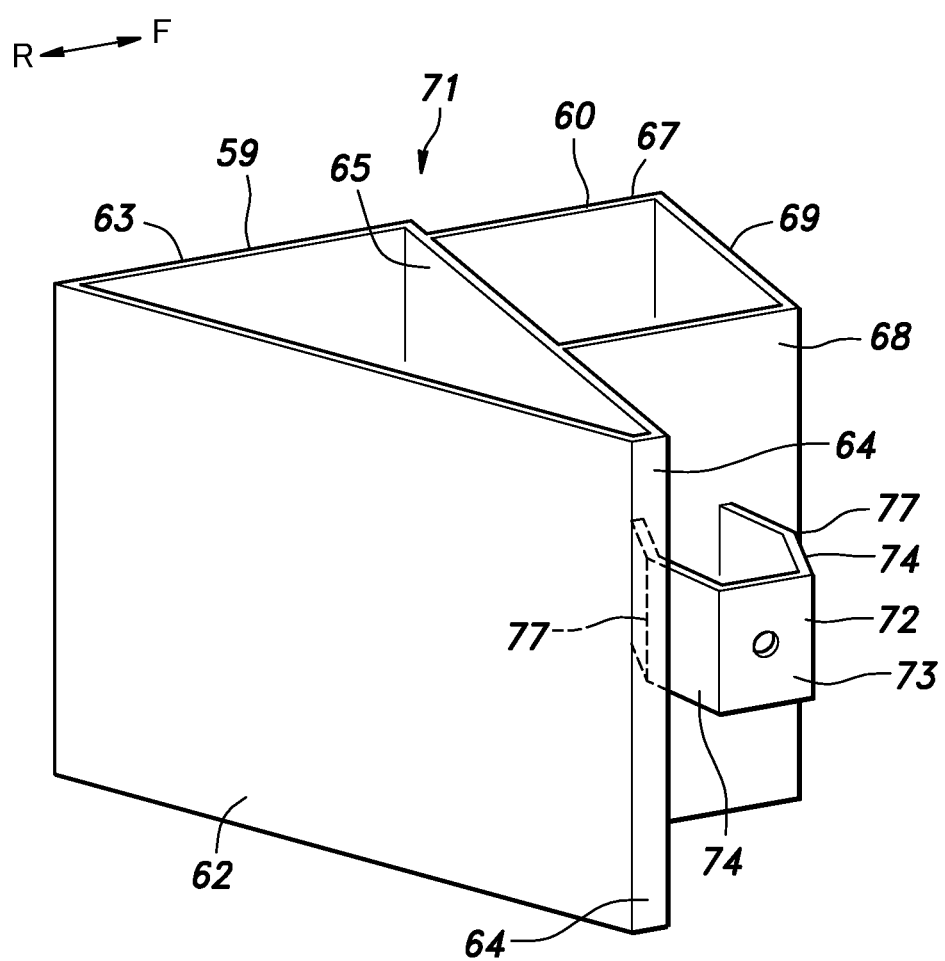
FIG. 4 is an enlarged perspective view of an extension member shown in FIG. 1.

The rear panel 6 is attached to the rear end of the side member 4 by using threaded bolts. The front part 60 is passed into the hollow interior 28 of the side member 4 from the rear via the opening 70 formed in the rear panel 6. The shoulder surface abuts the rear surface of the rear panel 6. As shown in FIG. 4, a cushioning member 72 is interposed between the outboard wall 67 of the front part 60 and the outboard wall 27 of the side member 4. The cushioning member 72 is made of sheet metal, and includes a rectangular outboard wall 73 having a major plane facing in the lateral direction, and a pair of side walls 74 extending from either side edges (front edge and rear edge) of the outboard wall 73. The inner edges of the side walls 74 are welded to the outboard wall 67 of the front part 60 in such a manner that the cushioning member 72 is connected to a substantially central part of the outboard wall 67 of the front part 60. The outboard wall 73 of the cushioning member 72 is laterally spaced apart from the outboard wall 67 of the front part 60 by a prescribed distance or a gap.

Each side wall 74 of the cushioning member 72 is formed with an outward bend 77 in a laterally central part of thereof. More specifically, a laterally central part of the rear side wall 74 is provided with a bend having a vertically extending bend line, and the ridge defined by the bend faces rearward. Similarly, a laterally central part of the front side wall 74 is provided with a bend having a vertically extending bend line, and the ridge defined by the bend faces forward. Therefore, when the outboard wall 67 of the front part 60 applies a load exceeding a certain limit value onto the cushioning member 72, the side walls 74 thereof bend about the bend lines thereof such that the two side walls 74 deflect away from each other. Therefore, the cushioning member 72 compresses under a lateral load in a predictable manner.

The outboard wall 73 of the cushioning member 72 and the outboard wall 27 of the side member 4 are formed with bolt holes, and threaded bolts are passed through these bolt holes and fastened so as to firmly connect the outboard wall 73 of the cushioning member 72 and the outboard wall 27 of the side member 4 to each other.

The effect of the vehicle body structure 1 described above is discussed in the following. As shown in FIG. 5, when an object A collides with the central part 55 of the rear bumper beam 3 from the rear, the central part 55 is subjected to a crash loading directed in the forward direction. As a result, the central part 55 is pushed forward so that the rear bumper beam 3 is deformed into a straight linear shape. This in turn causes the lateral end parts 56 of the rear bumper beam 3 to be displaced in the outboard direction.

As the lateral end parts 56 of the rear bumper beam 3 are displaced in the outboard direction, the front part 60 of each extension member 5 is pushed toward the outboard wall 27 of the side member 4. As a result, a lateral load directed in the outboard direction is applied to the inboard edges of the side walls 74 of the cushioning member 72 so that the side walls 74 bend away from each other about the outward bends. Thus, the cushioning member 72 collapses in the lateral direction from the state shown in the double-dot chain line to the state shown in the solid line in FIG. 5. As a result of the deformation of the cushioning member 72, the energy of the lateral impact load acting between the rear bumper beam 3 and the side member 4 is absorbed in a favorable manner.

Since a spacing or a gap is defined between the outboard wall 67 of the front part 60 and the outboard wall 73 of the cushioning member 72, the side walls 74 are allowed to bend as designed so that the lateral impact load acting between the rear bumper beam 3 and the side member 4 is absorbed in a favorable manner.

In particular, owing to the presence of the outward bends 77 in the side walls 74 of the cushioning member 72, the deformation of the side walls 74 can be achieved at a relatively small loading, and, more importantly, in a highly predictable manner. Therefore, the lateral impact load acting between the rear bumper beam 3 and the side member 4 can be absorbed in a reliable manner.

Second Embodiment

Figure 6A:
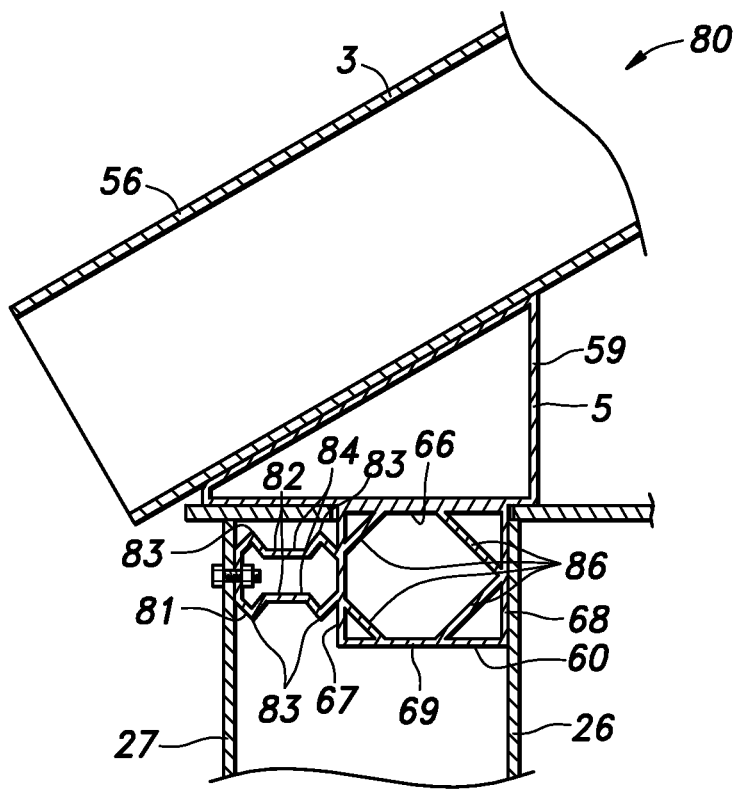
FIG. 6A is a view similar to FIG. 2 showing a second embodiment of the present invention.

As shown in FIG. 6A, a vehicle body structure 80 according to a second embodiment differs from that of the first embodiment in the shape of the side walls 82 of the cushioning member 81. The side walls 82 of the cushioning member 81 are each provided with a pair of outward bends 83 in an inboard part and an outboard part thereof, respectively, and the two outward bends 83 are connected by a planar connecting wall 84 having a major plane facing in the fore and aft direction. By providing the two outward bends 83 on each side wall 82, the side walls 82 of the cushioning member 81 are enabled to absorb a larger amount of energy when subjected to a lateral loading, as compared to the case where only one outward bend 83 is provided in each side wall 82.

Figure 6B:
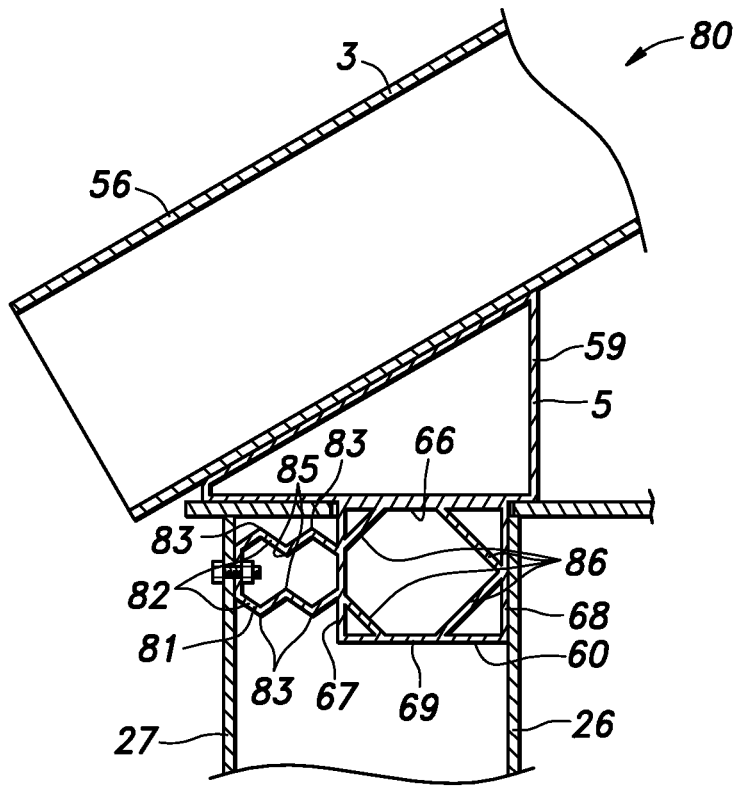
FIG. 6B is a view similar to FIG. 2 showing a modification of the second embodiment of the present invention.

A modification from the second embodiment shown in FIG. 6B is similar to the second embodiment shown in FIG. 6A, but differs therefrom in that each the side wall 82 includes an inward bend 85 located between the two outward bends 83 so as to form a bellows structure. This arrangement allows an even larger amount of energy to be absorbed at the time of a lateral loading.

If desired, brace walls 86 may be provided between the adjoining walls of the front part 60. In the embodiments illustrated in FIGS. 6A and 6B, a first brace wall 86 is provided between the front wall 69 and the inboard wall 68, a second brace wall 86 is provided between the inboard wall 68 and the rear wall 66, a third brace wall 86 is provided between the rear wall 66 and the outboard wall 67, and a fourth brace wall 86 is provided between the outboard wall 67 and the front wall 69. Instead of using four such brace walls 86, a fewer number of brace walls 86 may be used.

Third Embodiment

A vehicle body structure 90 according to a third embodiment differs from the first embodiment in the configuration of the cushioning member 91 as shown in FIG. 7. The cushioning member 91 is interposed between the outboard wall 67 of the front part 60 and the outboard wall 27 of the side member 4 similarly as in the first embodiment. The cushioning member 91 consists of a substantially rectangular resin block, and is formed so as to be deformable by a laterally directed load. When the extension member 5 is pushed toward the outboard wall 67 of the side member 4 in the same manner as in FIG. 5, a compressive load directed in the lateral direction is applied to the cushioning member 91, and the cushioning member 91 is deformed under this compressive load. Thus, the energy of the load applied to the rear bumper beam 3 from the rear can be absorbed by the deformation of the cushioning member 91. The cushioning member 91 may consist of any plastic or resin material that can be deformed in an elastic and/or plastic manner. The cushioning member 91 may be provided with a viscoelastic property so as to optimize the energy absorbing performance thereof.

In this embodiment, an additional cushioning member 92 is interposed between the inboard wall 26 of the side member 4 and the inboard wall 68 of the front part 60. The additional cushioning member 92 also consists of a substantially rectangular resin block similar to the cushioning member 91, and is formed so as to be deformable under a lateral tensile load. The additional cushioning member 92 may be attached to the inboard wall 26 of the side member 4 and the inboard wall 68 of the front part 60 by using an adhesive agent or vulcanization so as to oppose the movement of the front part 60 in the outboard direction due to a rear end crash in an elastic and/or plastic manner. The additional cushioning member 92 may be provided with a viscoelastic property so as to optimize the energy absorbing performance thereof.

When the impact load applied to the rear bumper beam 3 is within a certain limit, the rear bumper beam 3 may be able to regain the original shape after undergoing an elastic deformation. In such a case, the lateral end part 56 moves initially in the outboard direction, and then back in the inboard direction. If provided with a suitable elastic property, the cushioning member 91 and/or the additional cushioning member 92 are able to absorb the impact energy without undergoing any permanent deformation, and can be continued to be used without any problem after experiencing such an impact load. This property may be available from any of the other embodiments discussed in this disclosure, but an optimum result can be achieved by the cushioning member 91 and/or the additional cushioning member 92 of this embodiment provided with a suitable viscoelastic property.

Fourth Embodiment

Figure 8:
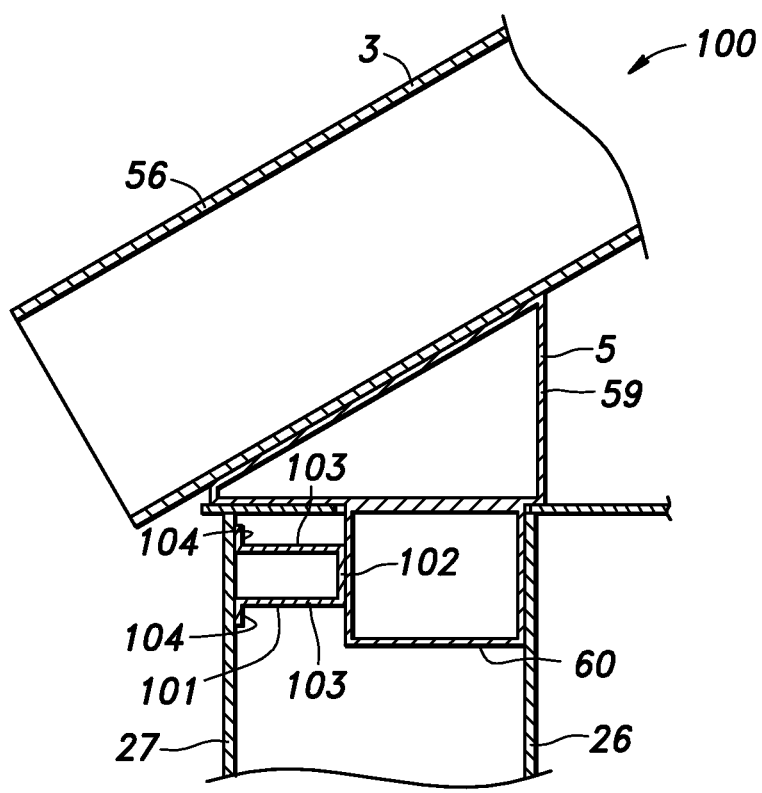
FIG. 8 is a view similar to FIG. 2 showing a fourth embodiment of the present invention.

As shown in FIG. 8, a vehicle body structure 100 according to a fourth embodiment differs from the first embodiment in the configuration of the cushioning member 101. The cushioning member 101 in this embodiment includes an inboard wall 102 having a major plane facing in the lateral direction, and a pair of side walls 103 extending from the front and rear edges of the inboard wall 102 in the outboard direction and having free ends (outboard edges) connected to the outboard wall 27 of the side member 4. In this embodiment, the free ends of the side walls 103 are provided with flanges 104 extending in the fore and aft direction mutually away from each other. These flanges 104 extend along and in close contact with the outboard wall 27 of the side member 4, and are welded to the outboard wall 27 of the side member 4.

When an impact load is applied to the rear bumper beam 3 from the rear, the front part 60 of the extension member 5 is pushed laterally in the outboard direction, and a load directed in the outboard direction is applied to the inboard wall 102 of the cushioning member 101. Since a certain distance (gap) is defined between the inboard wall 102 of the cushioning member 101 and the outboard wall 27 of the side member 4, the inboard wall 102 of the cushioning member 101 is pushed in the outboard direction, and deformed by a certain stroke that is permitted by the distance defined between the inboard wall 102 of the cushioning member 101 and the outboard wall 27 of the side member 4. Thereby, the energy of the impact load transmitted from the rear bumper beam 3 to the side member 4 can favorably be absorbed.

In this embodiment, the side walls 103 of the cushioning member 101 thus extend laterally from the front and rear edges of the inboard wall 102 parallel to each other, and one behind the other. The major plane of each side wall 103 extends in the fore and aft direction. Alternatively, the side walls 103 of the cushioning member 101 may extend laterally from the upper and rear edges of the inboard wall 102 parallel to each other, and one above the other. The major plane of each side wall 103 in this case extends in the vertical direction. The side walls 103 may be linear in this case, but may also be provided with outward and/or inward bends as was the case in the preceding embodiments.

Fifth Embodiment

Figure 9:
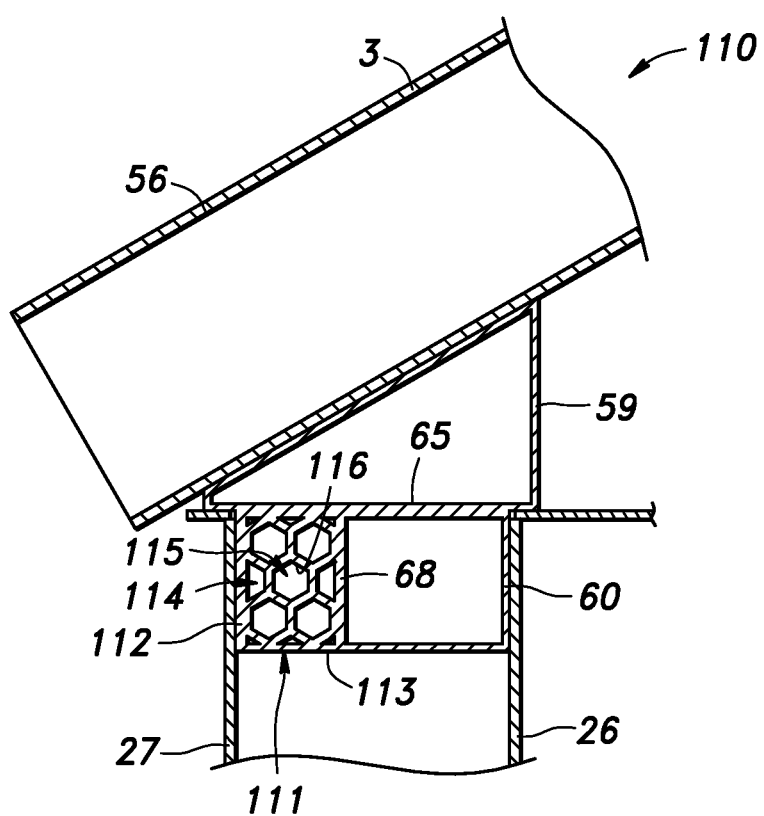
FIG. 9 is a view similar to FIG. 2 showing a fifth embodiment of the present invention.

A vehicle body structure 110 according to a fifth embodiment differs from the first embodiment in the structure of the cushioning member 111 as shown in FIG. 9. The cushioning member 111 includes an outboard wall 112 having a major plane facing in the lateral direction and connected to the front wall 65 of the rear part 59 at the rear edge thereof, and a side wall 113 extending from the front edge of the outboard wall 112 in the inboard direction, and connected to the front edge of the inboard wall 68 of the front part 60 of the extension member 5 at the inboard edge thereof. The outboard wall 112 of the cushioning member 111 is laterally spaced from the outboard wall 67 of the front part 60, and a honeycomb structure 114 is fitted into a rectangular space defined by the outboard wall 112 of the cushioning member 111, the side wall 113 of the cushioning member 111, the outboard wall 67 of the front part 60 of the extension member 5, and the front wall 65 of the rear part 59.

The honeycomb structure 114 includes a plurality of tubes 115 (hereinafter referred to as hexagonal tubes) each extending in the vertical direction and having a hexagonal cross section, and the hexagonal tubes 115 are bundled together into a honeycomb shape. Each hexagonal cylinder 115 is formed with an hexagonal inner hole 116 extending in the vertical direction. The hexagonal tubes 115 are each formed of a plate material made of metal such as carbon steel and aluminum alloy.

When an impact load is applied to the rear bumper beam 3 from the rear, the front part 60 of the extension member 5 is pushed in the outboard direction, and a laterally directed load is applied to the outboard wall 112 of the cushioning member 111. The hexagonal tubes 115 are deformed at the ridge lines thereof, and the honeycomb structure 114 collapses under this load. As a result, the energy of the impact load applied to the rear bumper beam 3 is absorbed by the collapsing deformation of the honeycomb structure 114. Since the energy absorbing capability of the honeycomb structure 114 for a given volume thereof is very high, a maximum amount of energy can be absorbed by the limited volume of the cushioning member 111. In an alternate embodiment, metallic or plastic foam structure is used as the energy absorbing structure for the cushioning member 111.

Sixth Embodiment

Figure 10:
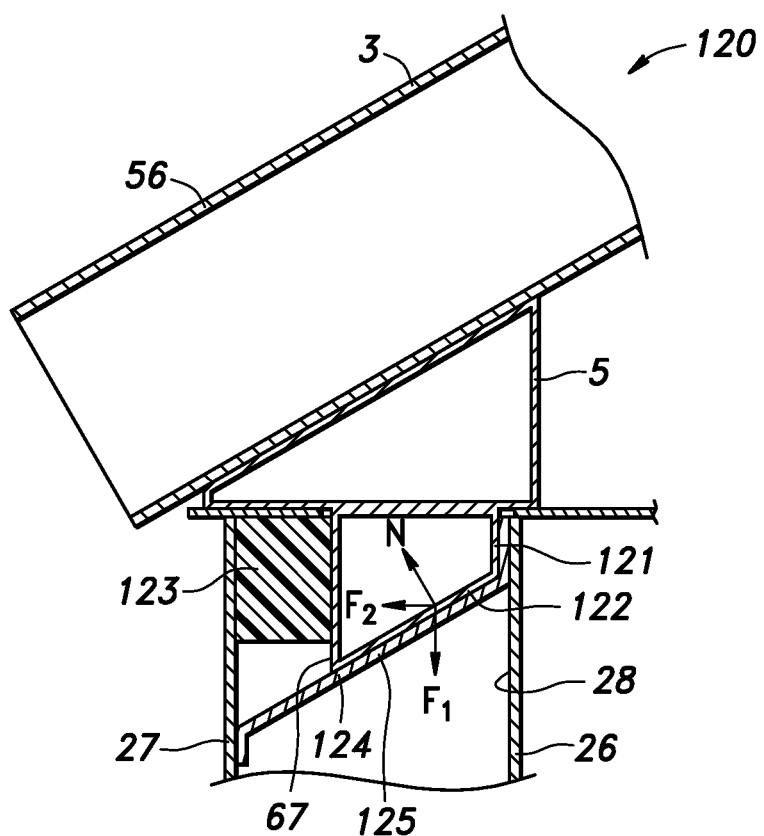
FIG. 10 is a view similar to FIG. 2 showing a sixth embodiment of the present invention.

As shown in FIG. 10, a vehicle body structure 120 according to a sixth embodiment differs from the first embodiment in that the front part 121 of the extension member 5 is provided with a front wall 122 that is inclined in a forward direction toward the outboard side, a cushioning member 123 made of resin is interposed between the outboard wall 67 of the front part 121 of the extension member 5 and the outboard wall 27 of the side member 4, and a bracket 124 is provided in the hollow interior 28 of the side member 4. The cushioning member 123 is provided with a rectangular configuration, and is configured to be deformed in the lateral direction under a lateral loading similarly to that of the third embodiment. The cushioning member 123 abuts the outboard wall 67 of the front part 121 of the extension member 5 at the inboard end surface thereof, and abuts the outboard wall 27 of the side member 4 at the outboard end surface thereof. The bracket 124 extends between the inboard wall 26 and the outboard wall 17 of the side member 4 at a certain angle, and extends also in the vertical direction. In particular, the bracket 124 includes a bottom wall 125 which is inclined in a forward direction toward the outboard side so as to conform to and make a surface contact with the front wall 122 of the front part 121 of the extension member 5, and a pair of flanges that abut onto, and welded to the inboard wall 26 and the outboard wall 17 of the side member 4, respectively.

Thus, when an impact load is applied to the rear bumper beam 3 from the rear, a forward force (F1 in FIG. 10) may be applied to the lateral end part 56 in addition to the lateral load. Since the front wall 122 of the extension member 5 abuts on the rear surface of the bottom wall 125 of the bracket 124, the extension member 5 further receives a reaction (N in FIG. 10) from the bottom wall 125. Therefore, a force (F2 in FIG. 10) which is the resultant force of the forward force and the reaction from the bottom wall 125 is applied to the extension member 5. As a result, a force directed in the outboard direction is transmitted from the extension member 5 to the cushioning member 123, thereby causing a compressive deformation of the cushioning member 123. Thus, the energy of the impact load applied to the rear bumper beam 3 can be absorbed in a favorable manner.

Seventh Embodiment

Figure 11:
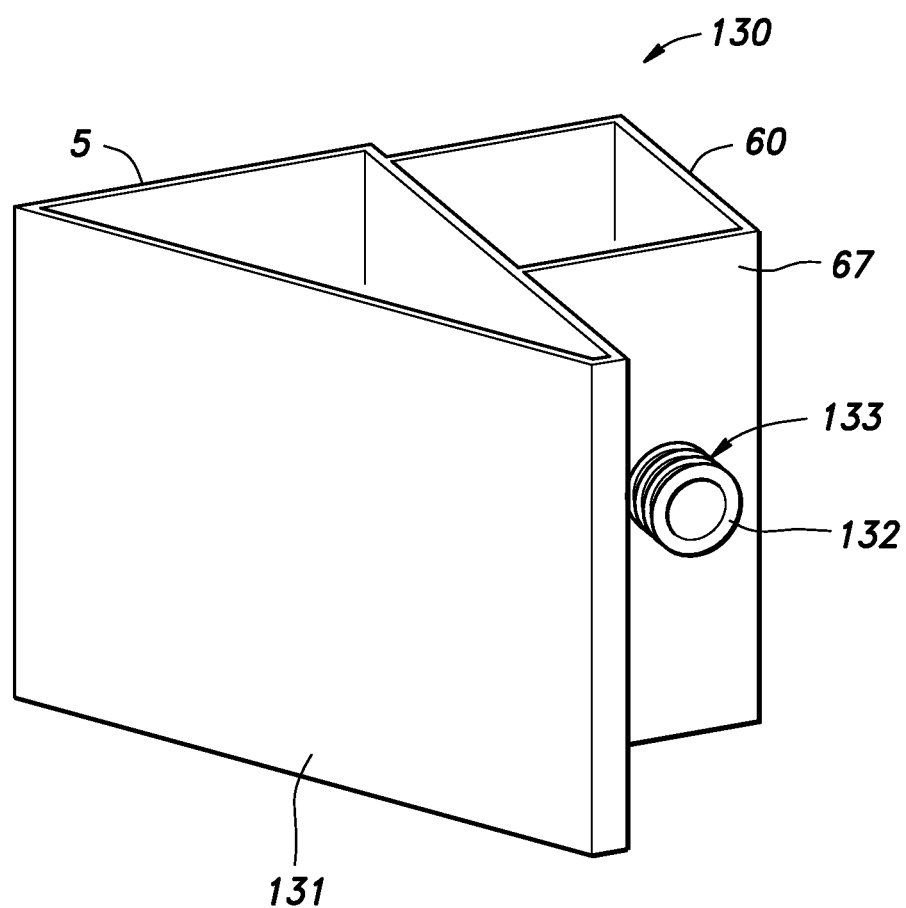
FIG. 11 is a perspective view of the extension member according to a seventh embodiment of the present invention.

As shown in FIG. 11, a vehicle body structure 130 according to a seventh embodiment of the present invention differs from the other embodiments in the shape of the cushioning member 131. As shown in FIG. 11, the cushioning member 131 includes a tubular member 132 having a circular cross section and having an axial line extending in the lateral direction. The base end of the tubular member 132 is welded to the outboard surface of the outboard wall 67 of the front part 60 of the extension member 5. In the illustrated embodiment, the free end of the tubular member 132 is formed as an open end, and abuts the inboard surface of the outboard wall 27 of the side member 4. The tubular member 132 is formed with a plurality of annular narrowed parts along the axial length thereof at a regular interval so as to form a bellows structure. The tubular member 132 is thus configured to be compressed in the axial direction when subjected to a lateral load in an elastic and/or plastic manner so that the energy of the impact load can be absorbed.

When an impact load is applied to the rear bumper beam 3 from the rear, the front part 60 of the extension member 5 is displaced in the outboard direction or toward the outboard wall 27 of the side member 4. As a result, the tubular member 132 is compressed with the result that the energy of the load transmitted from the rear bumper beam 3 to the side member 4 can be absorbed in a favorable manner.

The present invention has been described in terms of specific embodiments, but is not limited in scope by such embodiments, and can be modified in various ways without departing from the spirit of the present invention. In particular, the various features of the illustrated embodiments can be combined or substituted.

Figure 12:
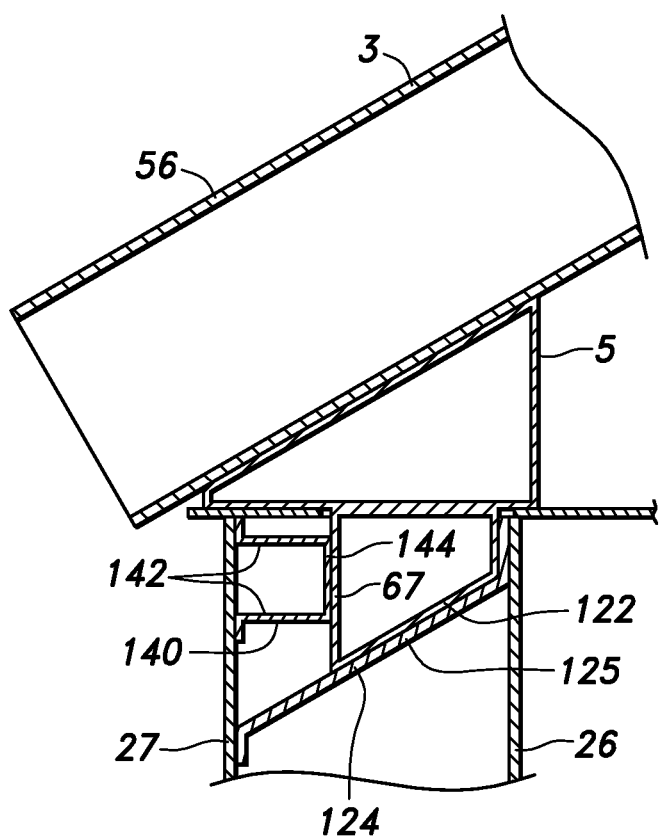
FIG. 12 is a view similar to FIG. 2 showing an eighth embodiment of the present invention.

For instance, the sixth embodiment illustrated in FIG. 10 can be modified by substituting the cushioning member 123 made of resin with the cushioning member 101 used in the fourth embodiment illustrated in FIG. 8. Such a modified embodiment is illustrated in FIG. 12. The cushioning member 140 in this case includes an inboard wall 144 having a major plane facing in the lateral direction, and a pair of side walls 142 extending from the front and rear edges of the inboard wall 144 in the outboard direction, respectively, and having free ends (outboard edges) connected to the outboard wall 27 of the side member 4. In this embodiment also, the free ends of the side walls 142 are provided with flanges extending in the fore and aft direction mutually away from each other. These flanges extend along and in close contact with the outboard wall 27 of the side member 4, and are welded to the outboard wall 27 of the side member 4.

Figure 13:
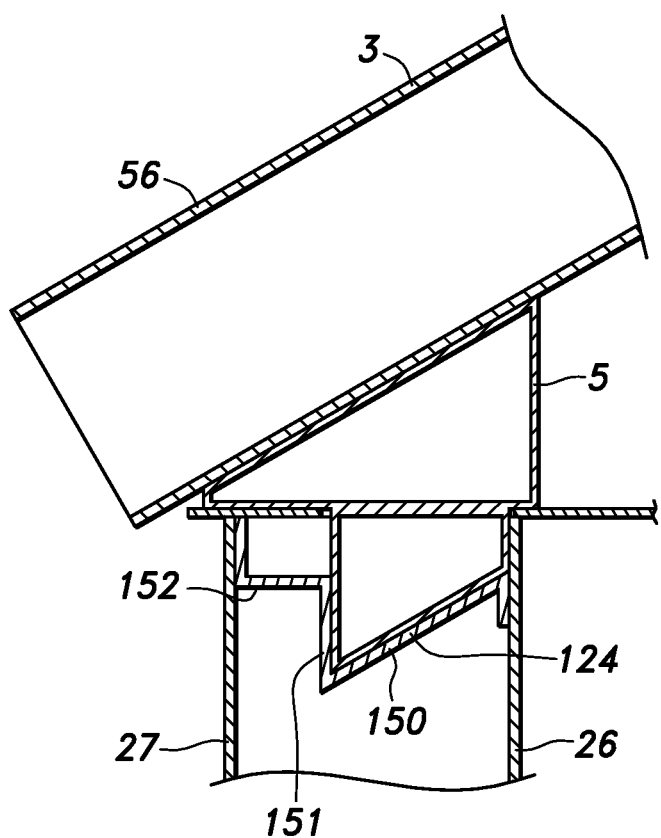
FIG. 13 is a view similar to FIG. 2 showing a ninth embodiment of the present invention.

In the modified embodiment illustrated in FIG. 13, the front part 121 of the extension member 5 is similar to that of the sixth embodiment illustrated in FIG. 19, and the bottom wall of the bracket 124 includes a front wall 150 that extends from the inboard wall 26 of the side member 4 therefrom in the outboard direction with an inclination in a forward direction toward the outboard side to a point coinciding with the front end of the front part 60 of the extension member 5, an outboard wall 151 extending from the front (outboard) edge of the front wall 150 in a rearward direction by a short distance, and a rear wall 152 extending from the rear edge of the outboard wall 151 and connected to the outboard wall 27 of the side member 4 via a flange formed in the rear wall 152. In this modified embodiment, the rear wall 152 of the bracket 124 performs the function of the cushioning members of the embodiments discussed above.

The foregoing embodiments were applied to a vehicle body rear part, but may also be applied to a vehicle body front part as can be appreciated by a person skilled in the art.

The invention claimed is:

1. A vehicle body structure, comprising:
 a pair of side members extending in a fore and aft direction on either side of a vehicle body, each side member having a hollow structure defining a hollow interior, and provided with a vertical outboard wall;
 a bumper beam extending laterally along fore and aft ends of the side members, and curved so as to be convex on a side thereof facing away from the vehicle body;
 a pair of extension members each connected to a corresponding end part of the bumper beam and partly received in the hollow interior of the corresponding side member; and
 a pair of cushioning members each interposed between the corresponding extension member and the vertical outboard wall of the corresponding side member, each cushioning member being deformable in a lateral direction of the vehicle body.

2. The vehicle body structure according to claim 1, wherein each cushioning member includes an outboard wall facing in the lateral direction, and a pair of side walls extending inboard from a front edge and a rear edge of the outboard wall, respectively, and having inboard edges connected to the corresponding extension member so that a gap is defined between the outboard wall and the extension member.

3. The vehicle body structure according to claim 2, wherein the side walls are each provided with a vertically extending outward bend, the two bends being directed in mutually opposite directions.

4. The vehicle body structure according to claim 2, wherein the side walls are each provided with a pair of vertically extending outward bends and a vertically inward bend interposed between the outward bends.

5. The vehicle body structure according to claim 1, wherein each cushioning member includes an inboard wall facing in the lateral direction, and a pair of side walls extending outboard from a front edge and a rear edge of the inboard wall, respectively, and having outboard edges connected to the vertical outboard wall of the corresponding side member so that a gap is defined between the inboard wall and the vertical outboard wall.

6. The vehicle body structure according to claim 1, wherein each cushioning member includes a honeycomb structure including a plurality of hexagonal tubes.

7. The vehicle body structure according to claim 1, wherein each cushioning member includes a plastic member which is deformable under a lateral load.

8. The vehicle body structure according to claim 1, wherein a bracket is provided in the hollow interior of each side member, the bracket including a bottom wall that inclines in an inward direction as one moves in an outboard direction, and abuts an inner end of the extension member with respect to the fore and aft direction.

9. The vehicle body structure according to claim 1, wherein each cushioning member comprises a tubular member having an axial line extending in the lateral direction, and provided with a bellows structure including at least one narrowed portion.

\* \* \* \* \*